US008803076B1

(12) United States Patent
Miller et al.

(10) Patent No.: US 8,803,076 B1
(45) Date of Patent: Aug. 12, 2014

(54) MULTIPLE GAMMA CONTROLLER ASSEMBLY

(71) Applicant: Leam Drilling Systems, LLC, Conroe, TX (US)

(72) Inventors: Kenneth Miller, Houston, TX (US); Abraham Erdos, Houston, TX (US); David Erdos, Houston, TX (US); James Mathieson, Conroe, TX (US); Joshua Carter, Conroe, TX (US)

(73) Assignee: Leam Drilling Systems, LLC, Conroe, TX (US)

( * ) Notice: Subject to any disclaimer, the term of this patent is extended or adjusted under 35 U.S.C. 154(b) by 0 days.

(21) Appl. No.: 14/174,700

(22) Filed: Feb. 6, 2014

Related U.S. Application Data

(60) Provisional application No. 61/886,509, filed on Oct. 3, 2013, provisional application No. 61/835,188, filed on Jun. 14, 2013.

(51) Int. Cl.
*G01V 5/04* (2006.01)
(52) U.S. Cl.
USPC .......................................................... 250/261
(58) Field of Classification Search
CPC ............ G01V 5/04; G01V 5/06; G01V 5/101
USPC .......................................................... 250/261
See application file for complete search history.

(56) References Cited

U.S. PATENT DOCUMENTS

| | | |
|---|---|---|
| 4,766,543 A | 8/1988 | Schmidt |
| 5,959,547 A | 9/1999 | Tubel et al. |
| 6,378,627 B1 * | 4/2002 | Tubel et al. ...................... 175/24 |
| 7,253,401 B2 | 8/2007 | Mickael et al. |
| 7,432,500 B2 | 10/2008 | Sale |
| 7,793,712 B2 * | 9/2010 | Yamate et al. ............... 166/65.1 |
| 7,818,128 B2 | 10/2010 | Zhou et al. |
| 7,880,134 B2 | 2/2011 | Kirkwood et al. |

(Continued)

FOREIGN PATENT DOCUMENTS

WO    WO 2009082551    7/2009

OTHER PUBLICATIONS

R. E. Kalman, A New Approach to Linear Filtering and Prediction Problems, Transactions of the ASME-HJournal of Basic Engineering, 82 (Series D); 35-45, 1960 US.

(Continued)

*Primary Examiner* — David Porta
*Assistant Examiner* — Mindy Vu
(74) *Attorney, Agent, or Firm* — Morgan, Lewis & Bockius LLP

(57) ABSTRACT

An improved gamma controller assembly to facilitate reliable downhole measurement of naturally occurring radiation is disclosed. The gamma controller assembly includes multiple gamma sensors, a micro-controller, memory, and input/output ports among other components. The multiple gamma sensors detect radiation and output pulses that are received by the microcontroller. The sensor data can be checked, selected, and averaged by the microcontroller, and sent uphole to another microcontroller or computer that can then further process, communicate, and display the data. The sensor data can be averaged and stored to memory or stored as independent values to memory. The gamma controller assembly can be configured to run algorithms that detect if one gamma controller appears to be malfunctioning and, if an apparent malfunction has occurred, adjust the sensor data that is being sent uphole.

22 Claims, 11 Drawing Sheets

(56) References Cited

U.S. PATENT DOCUMENTS

| | | |
|---|---|---|
| 7,950,473 B2 | 5/2011 | Sugiura |
| 8,049,164 B2 | 11/2011 | Kirkwood et al. |
| 8,269,162 B2 | 9/2012 | Kirkwood et al. |
| 8,573,327 B2 | 11/2013 | Trinh et al. |
| 2008/0041149 A1 | 2/2008 | Leuchtenberg |
| 2010/0171638 A1 | 7/2010 | Clark |
| 2010/0176286 A1* | 7/2010 | Duraj ............ 250/262 |
| 2011/0253448 A1 | 10/2011 | Trinh et al. |
| 2013/0105678 A1 | 5/2013 | Wilson et al. |

OTHER PUBLICATIONS

R. E. Kalman and R. S. Bucy, new Results in Linear Filtering and Prediction Theory, Journal of Basic Engineering, Mar. 1961 US.
PCT, PCT/US2014/015155, International Search Report, Date of mailing, Jun. 2, 2014.
PCT, PCT/US2014/015155, Written Opinion of the International Searching Authority, Date of mailing, Jun. 2, 2014.

* cited by examiner

MULTIPLE GAMMA CONTROLLER ASSEMBLY

RELATED APPLICATIONS

The present application claims the benefit of U.S. Provisional Patent Application Ser. No. 61/835,188 filed on Jun. 14, 2013 and U.S. Provisional Patent Application Ser. No. 61/886,509 filed on Oct. 3, 2013, each incorporated herein by reference in its entirety.

BACKGROUND

1. Field of the Invention

The present invention relates to downhole radiation measurement assemblies.

2. Description of the Related Art

Downhole radiation measurement assemblies have been used in drilling operations for some time. In downhole drilling it is useful identify sub-surface rock formations and customize drilling assemblies and drilling methods to suit a particular geological formation. This can be useful when, for example, a drilling rig has been configured to be effective for a particular type of rock formation and characteristics of the rock formation change as the wellbore extends deeper beneath the surface. It would thus be useful to identify rock formations present at various drilling depths at a wellsite. Downhole radiation measurement assemblies measure the naturally occurring low level radiation that is given off by rock formations downhole. Different types of rock can give off differing amounts of radiation or radiation having other differing characteristics and if measured accurately, the type of rock formations at different depths can be identified. Often, radiation measurement assemblies are deployed downhole and many measurements are taken at different depths in a well. The sensor measurements can then be communicated uphole and processed to determine the particular types of rock formations present at various depths at a particular wellsite. Radiation measurement assemblies can experience harsh vibrations and temperatures as well as other environmental conditions during the installation process, when taking radiation measurements, while sitting downhole, and also during retrieval. Over time drilling operations have seen drilling to greater depths, causing radiation measurement assemblies to experience increasingly harsher environments. In addition, many of the radiation measurement sensors can be particularly sensitive and malfunction in response to vibration, harsh temperatures, and other environmental factors. Vibration factors can be particularly problematic for radiation measurement sensors used in downhole radiation measurement assemblies. This can be due in part to the construction and sensitive components of radiation measurement assemblies. These factors and others continue to create the need for more advanced and reliable downhole radiation measurement assemblies.

Radiation measurement assemblies are commonly deployed with measurement while drilling tools. The purpose of measurement while drilling tools is to collect various sensor based measurements and facilitate the communication of the measurements to the surface. Measurement while drilling tools can be deployed with sensors for measuring various downhole conditions such as temperature, flow data, drillstring rotation, location information, radiation readings, or other useful downhole conditions. The sensors deployed alongside or as a part of measurement while drilling tools will often be configured to communicate data with the microcontroller or microprocessor that is a part of the measurement while drilling tool assembly deployed downhole. This communication may be made using standard protocols that transmit over bus connections between the measurement while drilling tool and the various sensors. Measurement while drilling tools can then communicate data from the sensors uphole to remote computers or data logging equipment. Measurement while drilling tools can be deployed by wireline or inline with the drillstring and can include remote power supplies or receive power over cabling run downhole. It is common to deploy a radiation probe that is connected to a measurement while drilling tool downhole to perform radiation measurements at various depths. The measurement while drilling tool can be configured to receive gamma probe data, which for example may be in the form of a pulse train, and then process and communicate the data to remote computers on the surface.

It would be desirable to have radiation measurement assemblies that include greater resilience to vibration, harsh temperatures, and other environmental factors that are present downhole. Further, it would be desirable to provide increased meantime between failures of radiation measurement assemblies installed downhole. This would allow greater drilling time, increased measurement time, and decreased time spent installing, retrieving, and servicing radiation measurement assemblies. It would further be desirable to decrease the time committed to servicing radiation measurement assemblies due to the failures of radiation measurement sensors that are particularly sensitive to the harsh environments downhole.

SUMMARY OF THE INVENTION

The present invention provides an improved gamma controller assembly to facilitate reliable measurement of naturally occurring radiation emitted from geological formations downhole. Radiation measurements are taken by multiple gamma sensors that are part of the improved gamma controller assembly. When the gamma sensors detect radiation they transmit pulses to a microcontroller that interprets and checks the measurements and then sends them uphole. In an alternate embodiment the microcontroller also writes the measurements to memory downhole. Once sent uphole, the measurements can be further processed and communicated to determine and display the make-up of geological formations downhole. The gamma controller assembly includes multiple gamma sensors, one or more microcontrollers, memory for storing the program run by the gamma controller assembly and for logging gamma sensor data, and input/output ports among other components. Gamma sensor data from multiple gamma sensors can be selected or averaged by the microcontroller and stored to memory or stored as independently logged values to memory. The sensor data can then be sent uphole to another microcontroller or computer based system that can then further process, communicate, and display the data. The gamma controller assembly is configured to run algorithms that detect if one gamma controller appears to be malfunctioning, and if the apparent malfunction has occurred, the assembly can be configured to communicate only the data from the correctly functioning sensors uphole. In another embodiment the gamma controller assembly can send all sensor data uphole and communicate what data is trusted and what data is not trusted. Once uphole, the gamma sensor data can then be further communicated to another microcontroller or computer based system for additional evaluation, processing, storage, or display.

BRIEF DESCRIPTION OF THE DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DETAILED DESCRIPTION

One purpose of the improved gamma controller assembly is to increase the reliability of downhole gamma sensor measurements. One of the frequent failures in a measurement while drilling system is for the gamma probe to fail. This can be very costly to remedy as the entire drill string has to be pulled from the well to replace the gamma probe, if there is even a spare available.

To mitigate this failure mode, the multiple gamma controller assembly facilitates redundant gamma probes in a single measurement while drilling tool. The multiple gamma controller assembly can also be configured to log various parameters of the tool downhole to assist with failure analysis when the tool is serviced. Using heuristics, if the multiple gamma controller assembly determines that each gamma probe is operating correctly, the multiple gamma controller assembly can then output a single pulse train which is a combined and filtered or alternately a single averaged reading from the multiple individual gamma probes to the measurement while drilling tool. In an alternate embodiment, the combined, filtered, or averaged reading output by the multiple gamma controller assembly can be communicated over a CAN bus or other bus known in the industry, to either the measurement while drilling tool or to other equipment uphole via mud pulsers, signal lines, or other communication methods. If however the multiple gamma controller assemblies' heuristics determine that one of the gamma probes has failed, it can exclude the failed gamma probe from the filtered output and only output a filtered pulse train based on the readings from the remaining gamma probes. In the preferred embodiment, it is preferred that two gamma sensor probes would be configured in each multiple gamma controller assembly; however, it is equally possible that three or more probes could be configured in a single assembly. For this embodiment the multiple gamma controller assembly may also be referred to as a dual gamma controller assembly. The mode in which a single pulse train is output to the measurement while drilling tool in particular is designed to work with measurement while drilling systems that expect to see one pulse train from a single gamma sensor downhole. In an alternate embodiment, data from each gamma sensor can be communicated to a measurement while drilling tool or uphole with an indicator as to what sensor data is trusted and what sensor data may be incorrect due to a possibly malfunctioning gamma probe.

Figure 1:
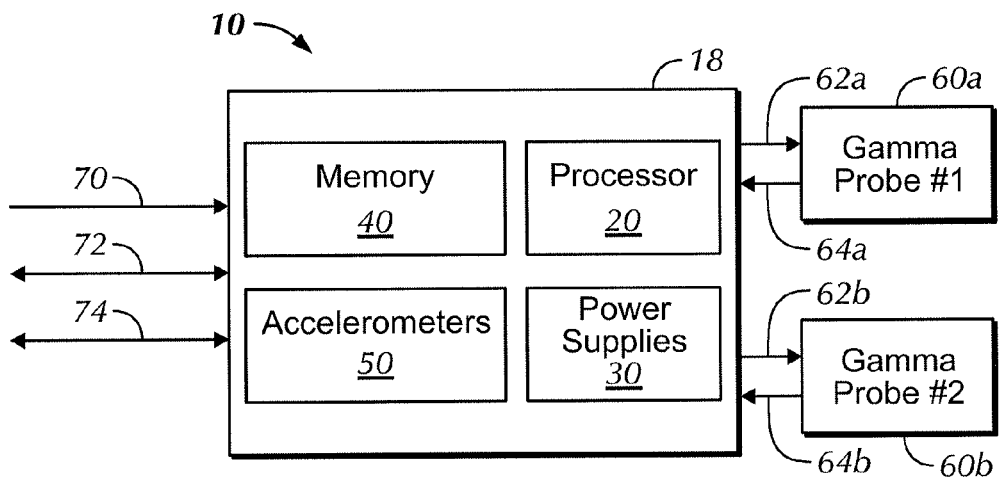
FIG. 1 depicts a block diagram of a multiple gamma controller assembly.
Figure 2:
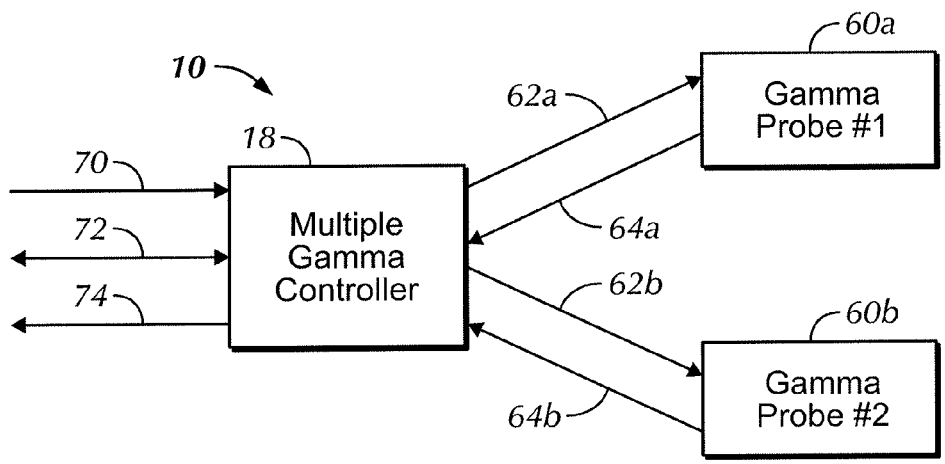
FIG. 2 depicts a schematic representation of the multiple gamma controller assembly.
Figure 3:
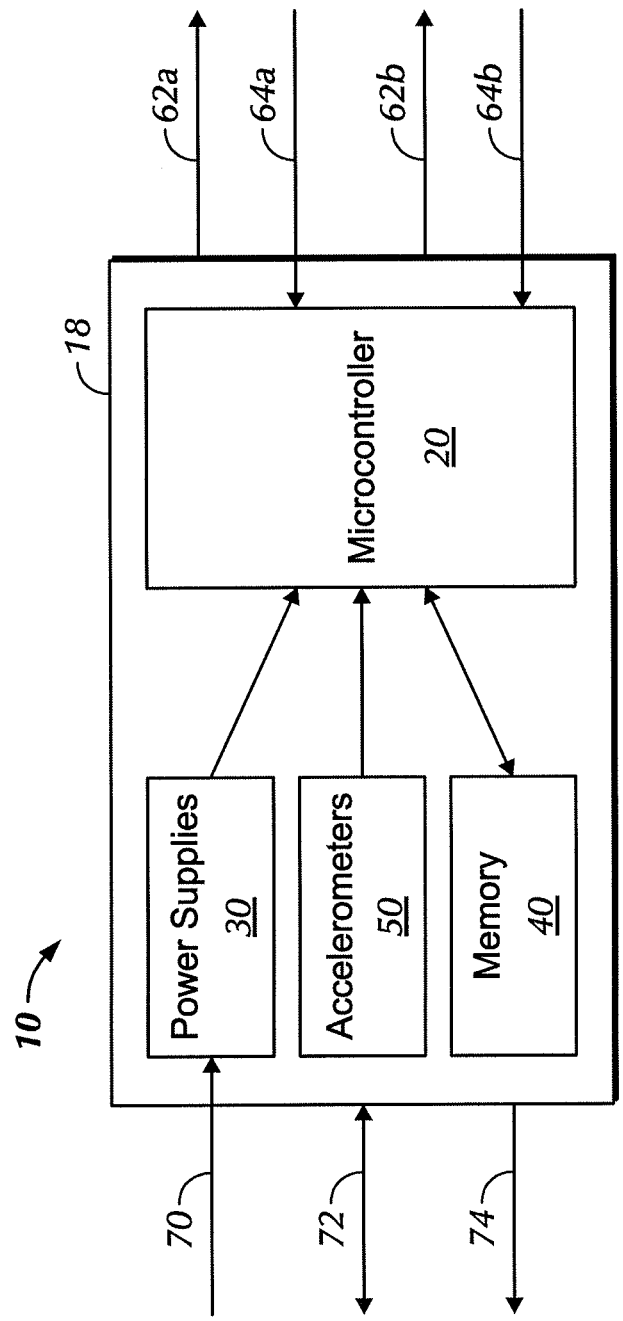
FIG. 3 depicts a schematic representation of the multiple gamma controller assembly.

Referring to FIGS. 1, 2, and 3, the multiple gamma controller assembly 10 has a controller module 18 that can be configured to include one or more microcontrollers or processors 20; one or more power supplies 30; memory 40 for storing the main executable program, for logging, and for storing configuration parameters; and accelerometers 50 or similar sensors for sensing shock and vibration. The multiple gamma controller assembly 10 further includes multiple gamma probes 60a and 60b, though more than two probes can be configured in an alternate embodiment. The controller module 18 can be configured to provide power to the gamma probes 60a and 60b over gamma probe power lines 62a and 62b. Data lines 64a and 64b also extend between the controller module 18 and the gamma probes 60a and 60b. In addition, the multiple gamma controller assembly 10 can be configured to include power lines 70, serial communication lines 72, and gamma sensor pulse output lines 74 that extend to a measurement while drilling tool (not shown) or from lines running from the surface to the tool. A single memory element can be shared for the main executable program, logging, and storing configuration parameters, or multiple memory elements can be utilized. There are three primary functions of the microcontroller or processor 20: (1) monitoring the health of the gamma probes, (2) logging tool parameters for failure analysis, and (3) sending gamma probe measurement data to a measurement while drilling tool or directly uphole. The multiple gamma controller assembly 10 can have multiple modes of operation, which are not mutually exclusive. In an embodiment the multiple gamma controller assembly 10 can have a transparent mode, where the controller will simply output a combined, filtered, or averaged pulse train to a measurement while drilling tool (not shown), and thus appearing to the measurement while drilling tool as a single gamma probe. This approach provides additional accuracy and reliability to current systems that are only configured to interact with a single gamma probe. In this mode, the measurement while drilling systems are "tricked" into thinking they are only receiving output from a single probe. In fact, this approach provides increased accuracy and reliability for low bandwidth systems that could not provide enough bandwidth to transmit data from multiple gamma sensors uphole. An alternate mode of operation allows the multiple gamma controller assembly to transmit data from the gamma probes and overall tool health status to the measurement while drilling unit as generic data values over the serial bus inside the tool, or over other bus types. For many types of measurement while drilling tools, this bus can have limited bandwidth, but for higher bandwidth systems, more sensor data could be communicated using this mode. Finally, if higher bandwidth systems are used, another alternate embodiment can allow for sensor data from each gamma probe sensor to be sent to the measurement while drilling tool or even uphole as separate pulse trains or by other means that would allow all of the sensor data or data from a select multiple number of sensors to be sent uphole.

Figure 4:
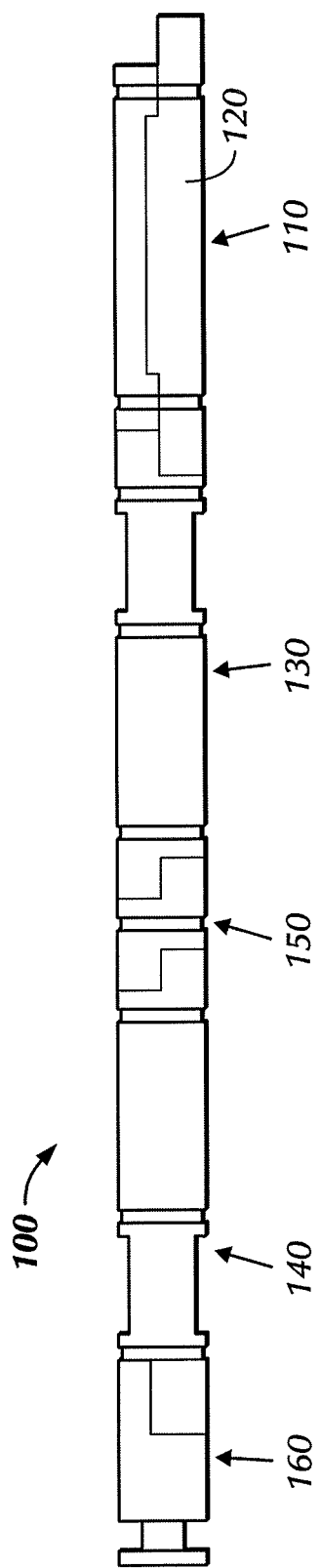
FIG. 4 depicts a side view of the multiple gamma controller assembly.
Figure 5:
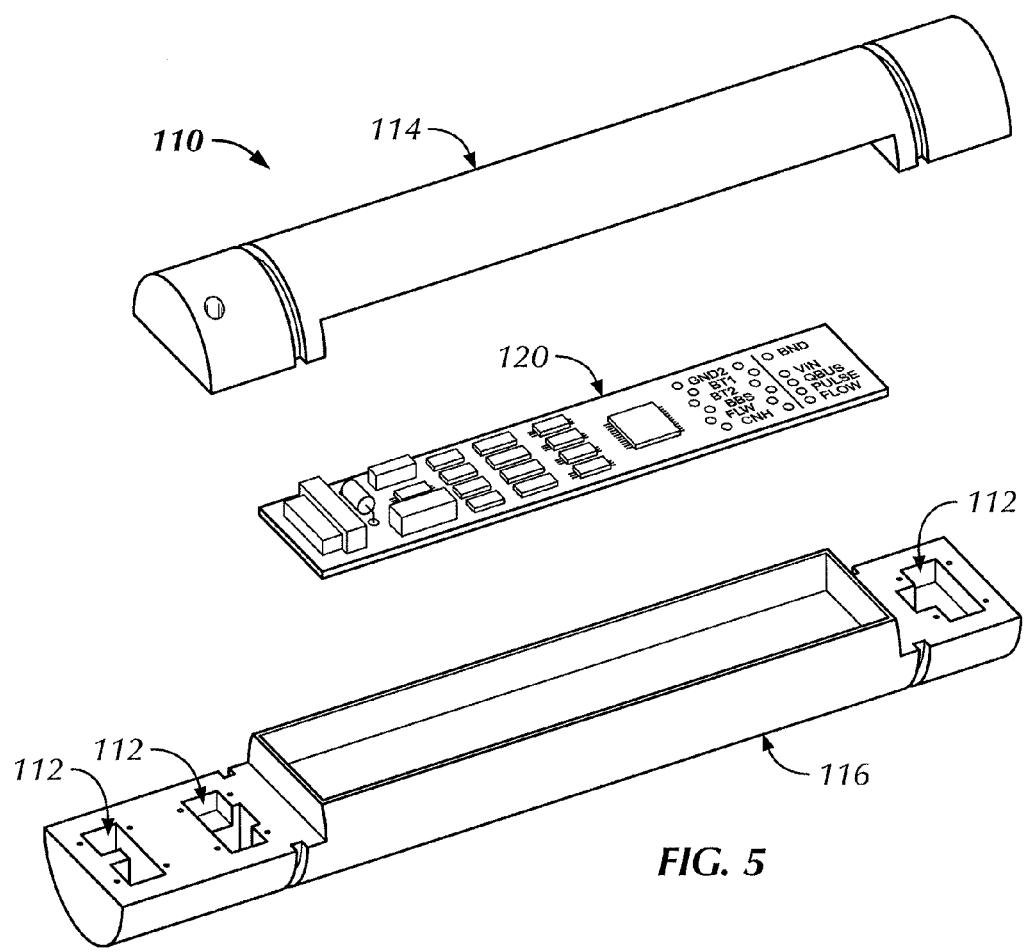
FIG. 5 depicts a side perspective view of the multiple gamma controller assembly.

Referring to FIG. 4, a multiple gamma stack assembly 100 is shown. The multiple gamma stack assembly 100 includes a multiple gamma controller chassis 110 that includes a controller circuit board module 120; a first gamma module 130; a second gamma module 140; a bus-cross-over module 150, and a snubbing end 160. Referring to FIG. 5, the multiple gamma controller chassis 110 houses the controller circuit board module 120 that is analogous to controller module 18 referenced in FIGS. 1-3. Module 120 can be configured to include one or more microcontrollers or processors; one or more power supplies or power supply voltage regulators; memory for storing the main executable program, for logging, and for storing configuration parameters; and accelerometers or similar sensors for sensing shock and vibration. In an embodiment, each of these sub-components may alternately be configured on separate circuit boards or as a part of other modules within the system. The chassis 110 provides sturdy connection ports 112 for connecting electrical lines between modules. A top hatch 114 and bottom hatch 116 protect the controller circuit board module 120 from the harsh downhole environments and also allow easy access for servicing. In alternate embodiments, different protective enclosures can be configured to protect the controller circuit board module 120 and the various other components of the multiple gamma stack assembly 100.

Figure 6:
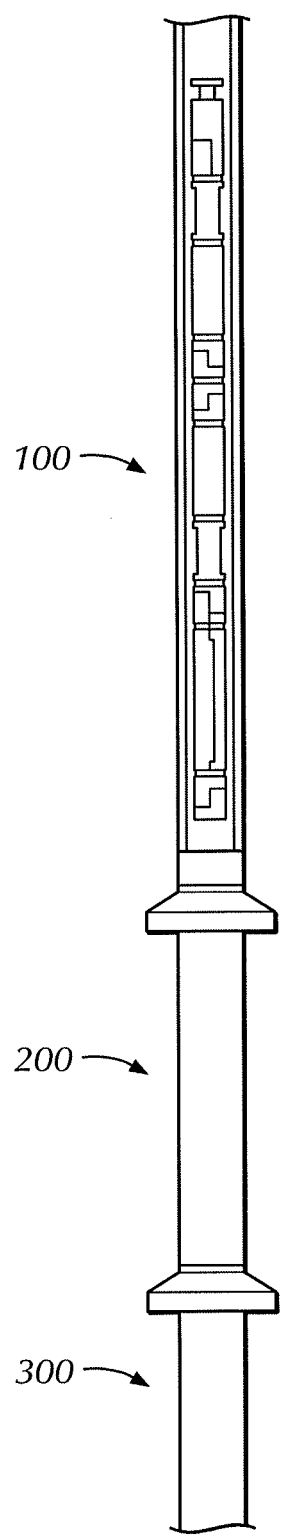
FIG. 6 depicts a side view of the multiple gamma controller assembly.
Figure 7:
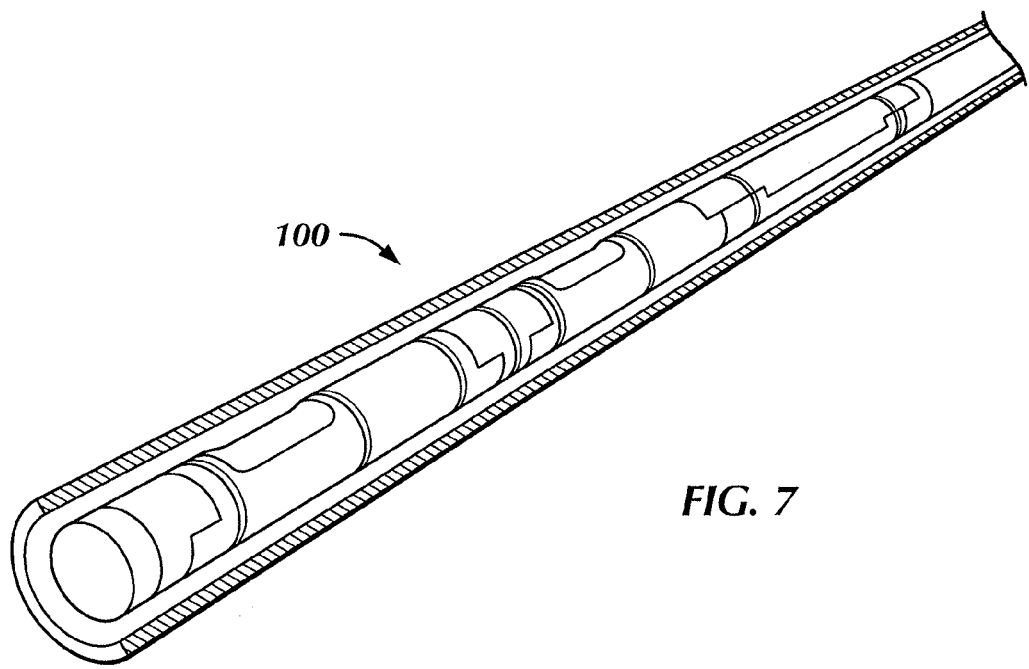
FIG. 7 depicts a side perspective view of the multiple gamma controller assembly within a well bore.
Figure 8:
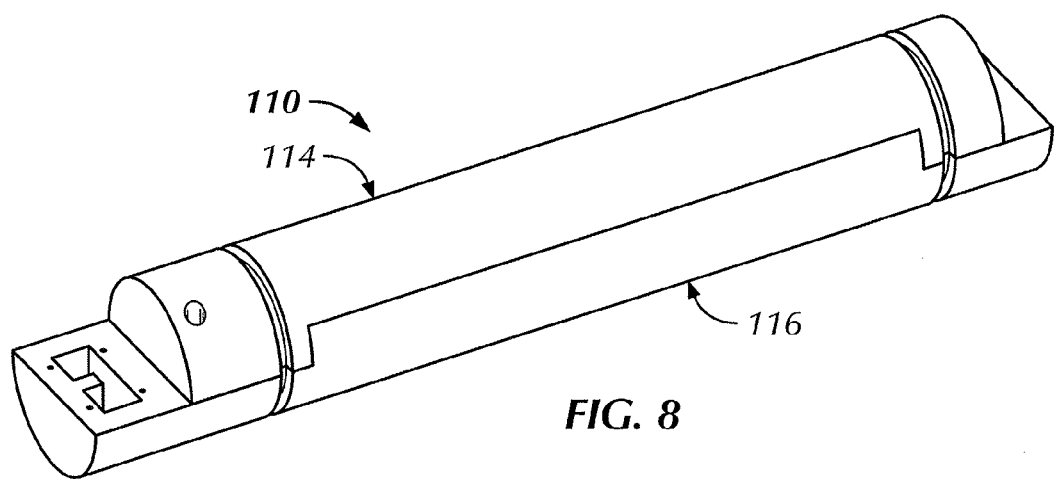
FIG. 8 depicts a side perspective view of a multiple gamma controller assembly chassis.
Figure 9:
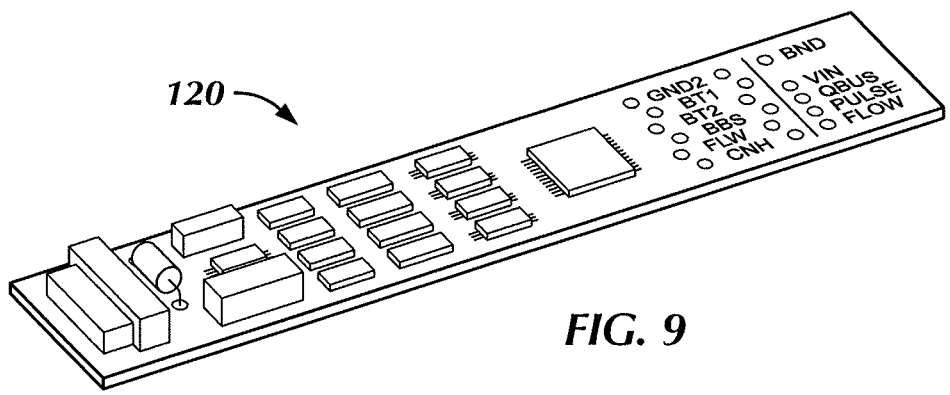
FIG. 9 depicts a side perspective view of a multiple gamma controller assembly circuit board.

Referring to FIG. 6, a multiple gamma stack assembly 100 is shown connected to a battery unit 200 and a pulser driver 300. The pulser driver 300 is one example of a communication system that can be configured to send information uphole or to the surface and receive information downhole from the surface. The pulser driver 300 can be configured to send and receive pulses through the drilling mud that can be detected by sensors. The pulses can then be interpreted by the sensors or other connected equipment. When deployed downhole this configuration or similar configurations may be used, for example non-pulser based communications systems such as wire based systems may also be used to send information and communicate with surface equipment. Referring to FIG. 7, an alternate perspective view of the multiple gamma stack assembly 100 is shown. Referring to FIG. 8, the gamma controller chassis 110 is shown with the top hatch 114 connected to the bottom hatch 116, both of which serve to protect the controller circuit board module 120 from harm. FIG. 9 shows a side perspective view of the controller circuit board module 120 that, as described above, can be configured to include various components of the multiple gamma controller assembly.

Figure 10:
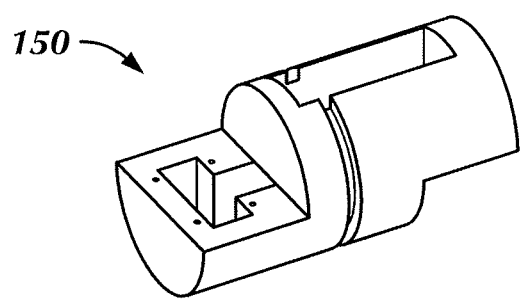
FIG. 10 depicts a side perspective view of a cross-over member of the multiple gamma controller assembly.
Figure 11:
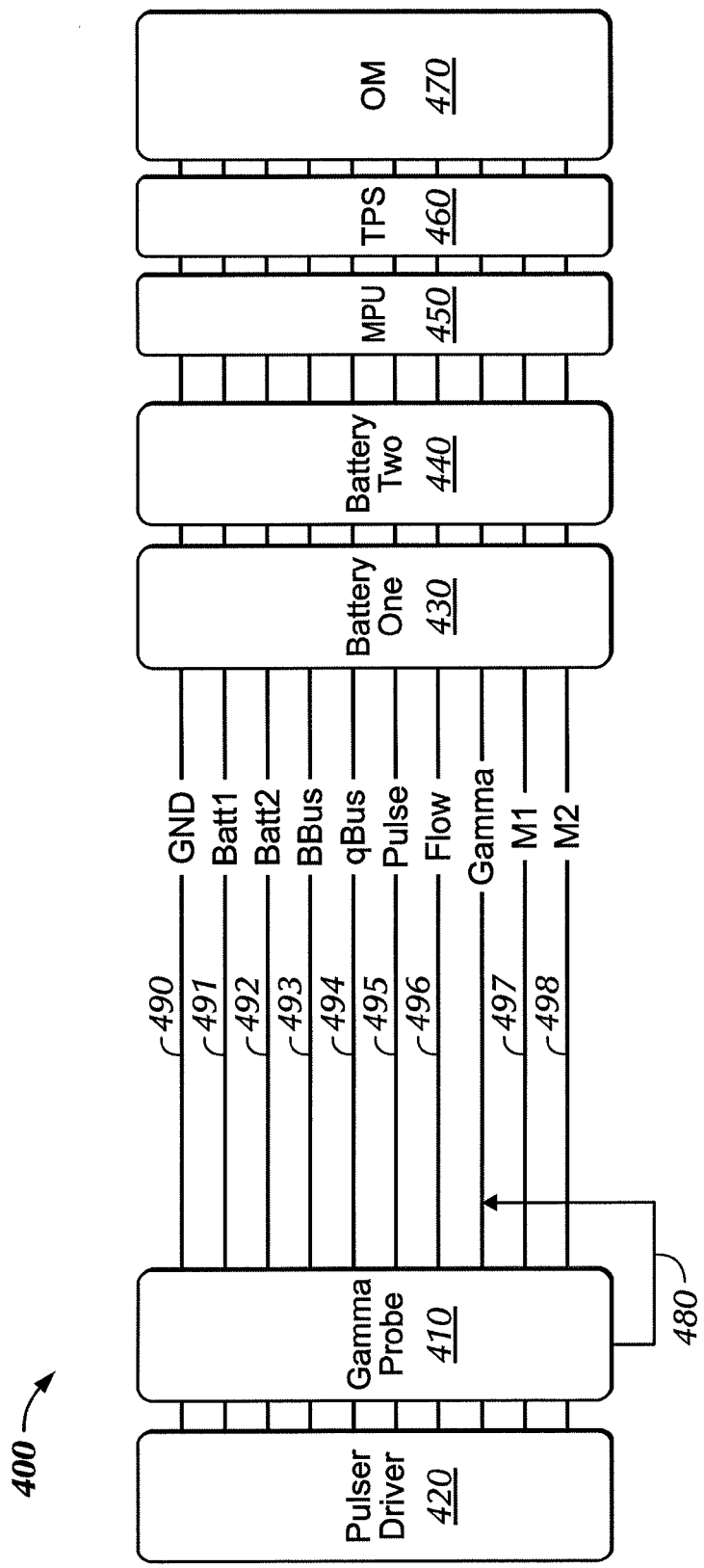
FIG. 11 depicts a block diagram of a measurement while drilling tool having only a single gamma sensor.

Referring to FIG. 10 the bus cross-over module 150 is shown. For multiple gamma controller assemblies that include three or more gamma probes, multiple bus cross-over modules 150 can be configured to allow the connection of additional probes. In an embodiment, the bus cross-over module 150 facilitates the connection of multiple gamma probes to a multiple gamma controller in a system that was originally designed for the use with only a single gamma probe. The cross-over module 150 can be configured to place gamma probe output line data onto spare signal carrying lines of the bus, the multiple gamma controller can then read and interpret the output of the gamma probes in these lines. FIG. 11 is an example block diagram showing the components and wiring layout of a measurement while drilling tool 400 having a single gamma probe 410. In this example a pulser driver 420 serves as the surface communication link to the tool 400 and battery power is provided to the various components through battery one 430 and battery two 440. A main processing unit ("MPU") 450, triple power supply ("TPS") 460, and orientation module ("OM") 470 are also included in this configuration. The gamma probe 410 output radiation measurement readings on the gamma bus line 480. The readings are then processed by the MPU 450 which then sends representative data values or the full pulse train information to the surface through the pulser drive 420. In addition to the gamma bus line 480, the bus 405 that runs between the various components can include a ground line ("GND") 490, a battery one line ("Batt1") 491, a battery two line ("Batt2") 492, a BBus signal line ("BBus") 493, a qBus signal line ("qBus") 494, a pulse signal line ("Pulse") 495, a flow signal line ("Flow") 496, an m1 signal line ("M1") 497, and an m2 signal line ("M2") 498. The bus described carries power from the batteries to the various components and also serves as the communication links between the components.

Figure 12:
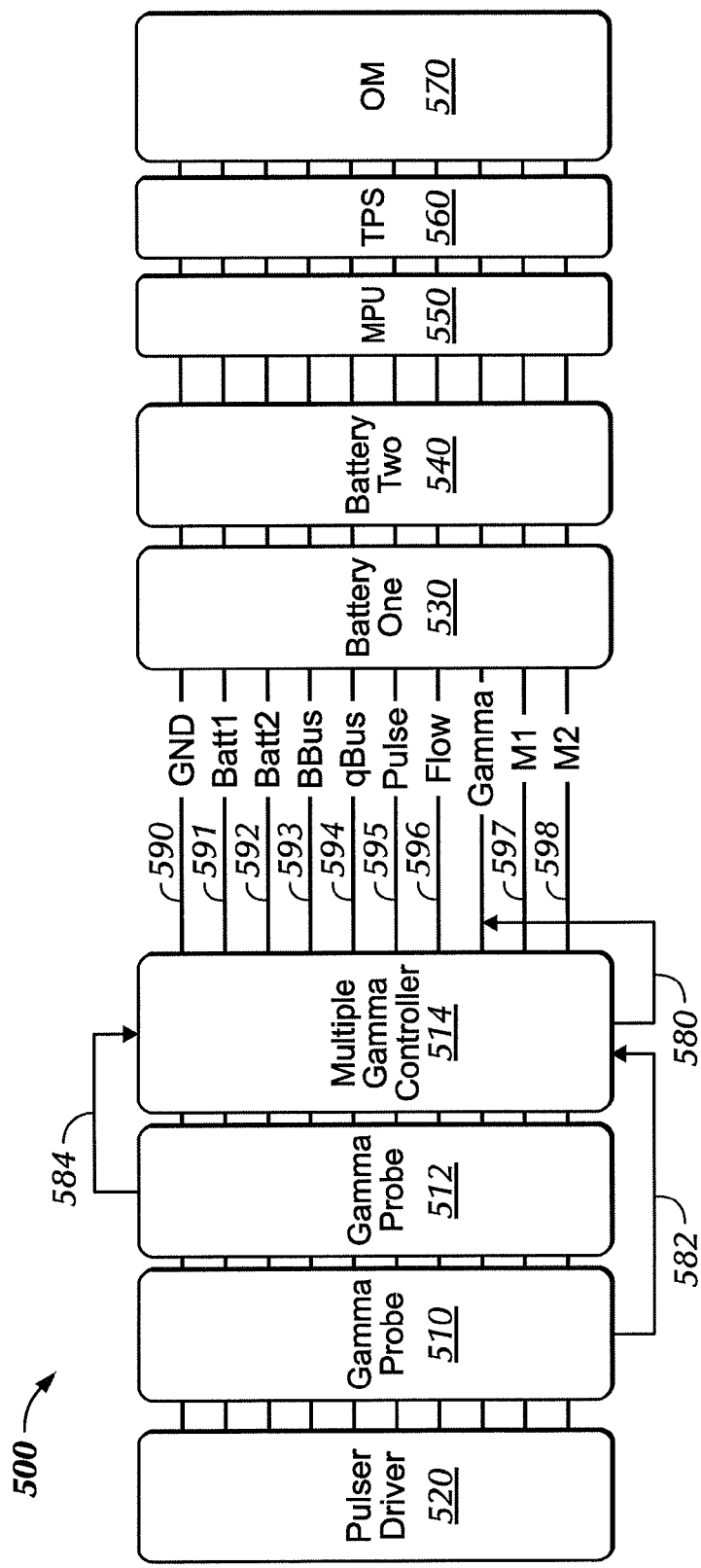
FIG. 12 depicts a block diagram of a measurement while drilling tool having the multiple gamma controller assembly.

Referring to FIG. 12, an example block diagram showing the components and wiring layout of a measurement while drilling tool 500 having multiple gamma probes and a multiple gamma controller 514 is shown. Gamma probe 510 and gamma probe 512 output their radiation measurement readings to the multiple gamma controller 514. The bus cross-over module as described in FIG. 10 can be configured when implementing this layout to, re-route the output of each gamma probe onto spare signal lines that are part of the bus. The gamma probe data is routed to the microcontroller of the multiple gamma controller assembly and the microcontroller runs algorithms against the gamma probe output data to determine the gamma probe data to place onto the gamma probe output line or lines that is then communicated to a measurement while drilling tool or other data channels that communicate the information uphole. Similar to the single probe configuration described in FIG. 11, in this example a pulser driver 520 serves as the surface communication link for the tool 500 and battery power is provided to the various components through a battery one 530 and a battery two 540. A main processing unit ("MPU") 550, triple power supply ("TPS") 560, and orientation module ("OM") 570 can also be included in this configuration. The first gamma probe 510 outputs radiation measurement readings on the gamma output line 580 and the second gamma probe 512 outputs radiation measurement readings on the gamma output line 584. The readings are then received and processed by the multiple gamma controller 514, which combines, averages, or filters the readings using one or more of the methods described herein. The multiple gamma controller 513 then continuously generates a representative gamma output value that is sent to the MPU 550 or the pulser driver 520 for communication uphole. Similarly to the methods described above, heuristics can be employed by the multiple gamma controller 514 and probe data can be adjusted, disqualified, and re-qualified accordingly. In addition to the gamma bus line 580, the bus that runs between the various components can include a ground line ("GND") 590, a battery one line ("Batt1") 591, a battery two line ("Batt2") 592, a BBus signal line ("BBus") 593, a qBus signal line ("qBus") 594, a pulse signal line ("Pulse") 595, a flow signal line ("Flow") 596, an m1 signal line ("M1") 597, and an m2 signal line ("M2") 598. The bus described carries power from the batteries to the various components and also serves as the communication links between the components. The bus described in this paragraph is merely one embodiment and configuration of the multiple gamma controller assembly. Other bus configurations, tool configurations, communication protocols, and communication topologies can be used in conjunction with the multiple gamma controller assembly. Using the methods described, a multiple gamma controller assembly can be integrated into a tool that typically only uses one gamma probe, such as the system described in reference to FIG. 11. Bus cross-over modules can be configured for use in the described system to carry the gamma probe output data over spare bus signal lines or alternatively other signal lines apart from the main bus can be used. The multiple gamma controller assembly can also be integrated into other types of systems that are configured to only use one gamma probe by default.

In an embodiment, the multiple gamma controller assembly can be configured to interact with multiple measurement while drilling tools, different types of measurement while drilling tools, or other tools that allow communication to the surface. For each of these tools, different amounts of bandwidth may be available to transmit data uphole and the multiple gamma controller assembly can be configured to send more or less gamma sensor data depending on the bandwidth available. For example, the frequency of the readings sent to the surface can be adjusted according to the bandwidth available for the transmission.

Further, in an embodiment, the filtering of the output counts from the multiple gamma probes could simply be the average of the counts per second (or other time interval) from the multiple gamma probes. Additionally, the filtering could also be a weighted average of the gamma sensor outputs, if certain sensors are determined to be in better health than the others. More advanced filtering may also be performed using a state estimator to estimate the overall background radiation based on the readings from the multiple gamma probes. The filtered output can also take into account the API calibration factors for each gamma probe, and these values can be stored in the multiple gamma controller assembly's memory.

The microcontroller or processor of the multiple gamma controller assembly can continually monitors the pulse train output of each gamma probe which should correspond directly to the gamma radiation levels downhole. The microcontroller can be configured to keep statistics about the performance of each gamma probe, and if, based on its heuristics it determines that one of the gamma probes has failed, it will exclude from the combined, filtered, or averaged, output the counts of the failed probe.

Several different heuristics can be used to determine if a gamma probe is malfunctioning. In an embodiment, those heuristics may optionally include, but are not limited to: (1) high counts, that is counts greater than some threshold, (2) low counts, that is counts less than some threshold, (3) counts changing too quickly, meaning that the rate at which the counts are increasing or decreasing (the derivative of the counts per second with respect to time) is too high/low, (4) the standard deviation over time is increasing beyond an acceptable limit, (5) kurtosis analysis, (6) skew of counts over time, or (7) other statistical measurements. If a gamma probe is determined to be malfunctioning based on the heuristics, then, for a microcontroller operating in a single pulse train mode, the counts from the probe may no longer be included in the filtered output or pulse train of the microcontroller. Likewise, in a mode where multiple sensor outputs are being communicated to the measurement while drilling tool or uphole, when the heuristics detect the possible malfunction of a sensor, the output data for that sensor may be tagged as invalid or potentially incorrect. However, the outputs from the failed gamma probe will be continually monitored to determine whether or not the gamma probe has recovered. Occasionally gamma probes output unreasonably high counts as the temperature increases, or if a shock event occurs, but then recover once the temperature decreases or the shock/vibration levels decrease. If a failed gamma probe is determined to be within the operational limits once again for some set period of time, then it can once again be included in the filtered output or pulse train or the tagging included with the gamma probe data can be changed back to valid or good.

In an embodiment, the microcontroller can be configured to constantly compare the values read from both gamma probes and compare or check the health status data for each of the gamma probes as well. Generally, there are two main failure modes for the gamma probes, high counts and low counts. Either failure mode has to do with some portion of the standard gamma sensor failing. For example, the crystals can crack, the photomultiplier tubes can crack or otherwise fail, the high voltage power supply can drift or stop supplying power, and in some cases the discriminator circuit may fail as well. Typically these failures cause a gamma sensor to return no counts at all or abnormally high counts. Based on this notion the microcontroller of the multiple gamma controller assembly is configured to run algorithms that check for high and low counts. In an embodiment, a low and a high threshold are set in accordance with readings anticipated from gamma sensors downhole. These threshold values may be adjusted for different types or brands of sensors, or to accommodate for desired thresholds at a particular wellsite. If the readings from any one gamma sensor exceed these bounds, high or low, it is immediately disqualified from the system and any averaging calculation that is performed. In some of the alternate embodiments where gamma sensor readings from more than one gamma probe are conveyed, the data from an out of bounds probe is merely flagged as invalid or disqualified. To be considered operational again, the reading must return to the acceptable range and stay within bounds for a set timeframe. If the sensor stays out of bounds for a large amount of time, it can be permanently disqualified from the calculation, at least for a given installation or over a certain time period.

In an alternate embodiment where three or more gamma probes are configured, a majority rules protocol can be put into place. In this setup the two probes with the closest counts are used and can be combined, averaged, or filtered, with the readings from the third probe being discounted for a given reading comparison or for a given time period. In this configuration, should one or more probes fail, the remaining probes can be switched from the majority rules protocol back to other methods where all of the probes values are again combined, averaged, filtered, or otherwise processed and then communicated to the measurement while drilling tool or uphole.

Some probes can also be sensitive to temperature and have counts that drift at temperature extremes. Comparing temperature readings to count data can be used to determine if a particular probe is experiencing temperature drift and adjustment can be made to the count values from that probe. Alternatively, if a temperature drift passes a pre-determined threshold the probe can be disqualified temporarily and re-qualified later if readings return to within the pre-determined threshold.

Figure 13A:
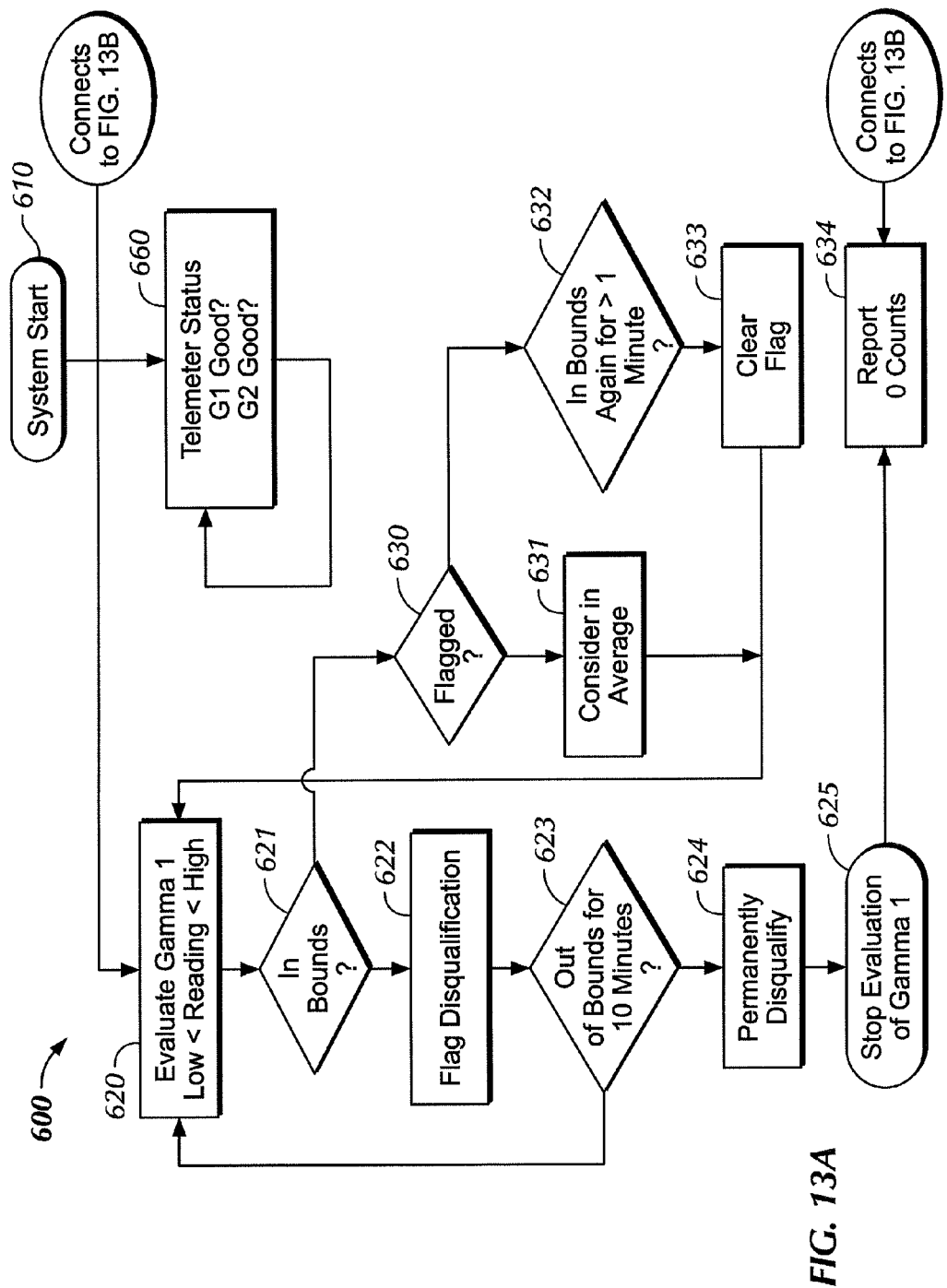
FIG. 13A depicts a first portion of a flow chart of a kick-out algorithm for the multiple gamma controller assembly, with FIG. 13B depicting a second portion.
Figure 13B:
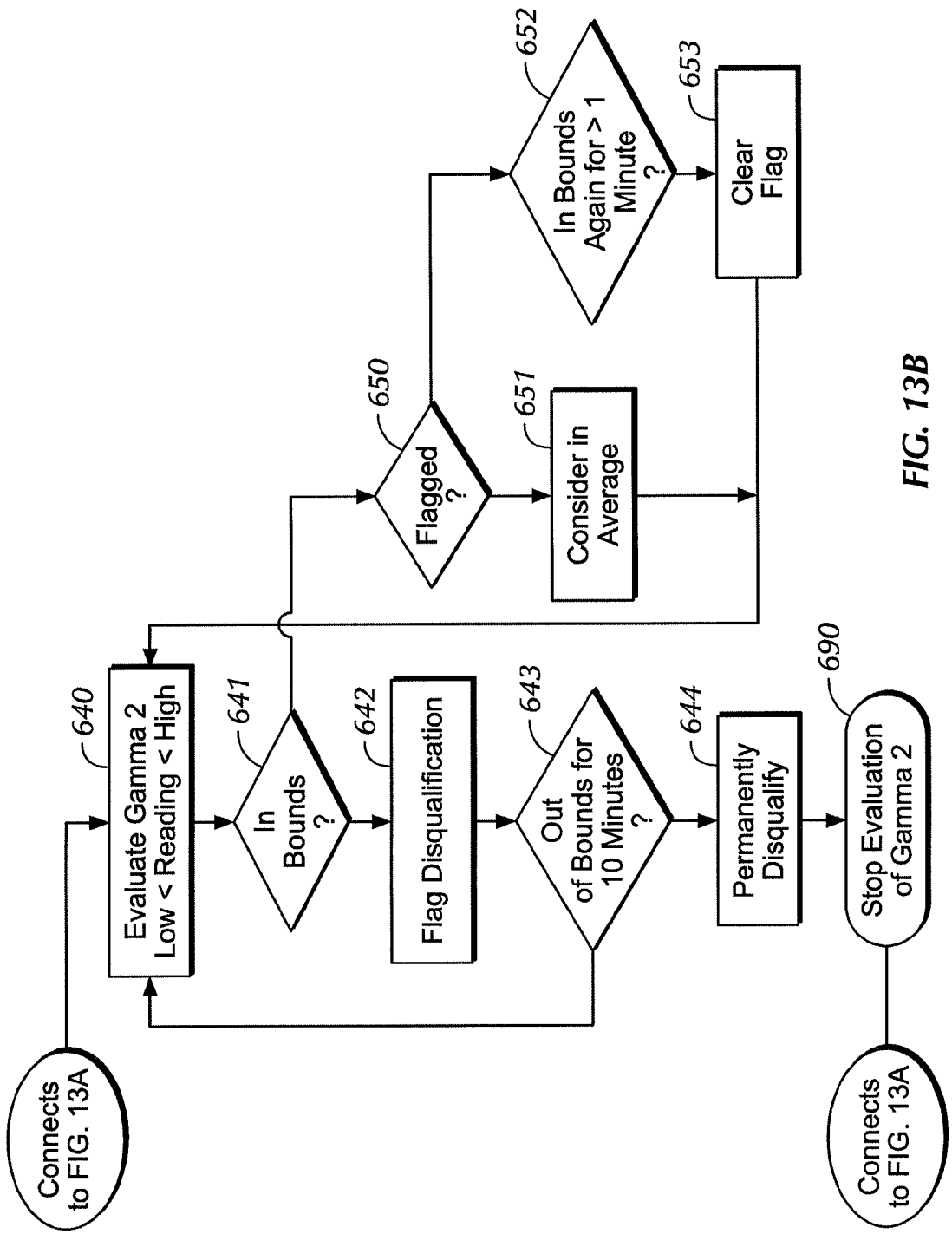
FIG. 13B depicts the second portion of a flow chart of a kick-out algorithm for the multiple gamma controller assembly, with FIG. 13A depicting the first portion.

Referring to FIGS. 13A and 13B, two portions of a single flowchart of an example algorithm 600 run by the multiple gamma controller is shown. In this example, the system starts 610 and one algorithm routinely checks and logs telemeter status 660 so that location information can be associated with the readings collected by the probes. The health of the telemeter status readings can optionally be checked as part of this sequence using heuristics based algorithms. Collected data may be disqualified or data logging may be suspended if telemeter readings are called into question. A routine algorithm is also run to evaluate gamma one 620 and evaluate gamma two 640, and determine if the counts received are between pre-determined high and low values. The pre-determined values can be different for different probe types of for different individual probes of the same type, this may be based on testing, calibration values, or the previous use of a given probe. Additionally, the high and low values may be set to different ranges for different rock formations and other environmental conditions. The gamma probe readings are each evaluated to determine if they are in bounds 621 641 of the pre-determined range. If a value is determined to be in bounds 621 641, a routine algorithm then checks to see if the gamma probe was recently flagged 630 650. If the probe was flagged 630 650, it is not considered in the average 631 651 but instead checked to be in bounds for a pre-determined time 632 652, in this example, one minute. If the probe is in bounds for greater than one minute 632 652, the flag disqualifying the probe is cleared 633 653, and the next time the probe is checked and verified in bounds the readings from that probe will be considered in the average 631 651. Alternatively, the probe readings may be considered in an average, combined, filtered, considered in a majority rules protocol comparison, or otherwise used as described in the various algorithms. As this is an example, in an alternate embodiment the probes can also be flagged and temporarily or permanently for various other reasons, consistent with what has been mentioned previously. When a probe is determined to be in bounds 621 641 and determined to be not flagged 630 650, it may then be considered in average 631 651 or otherwise considered-good by the multiple gamma controller. A gamma probe that provides out of bounds data is flagged 622 642 the first time it provides an out of bound result. If the gamma probe continues to provide out of bounds results in excess of the configured ten minute timeframe 623 643 of this example, the probe is permanently disqualified from use 624 644. In this event, the multiple gamma controller assembly can be configured to send a message to a remote computer indicating the probes failure (not shown). When a probe is permanently disqualified 624 644, evaluation of the probes output is stopped 625 690. In an embodiment, the described sequences can optionally be carried out on more than two probes. Also, in an embodiment, this sequence need not be carried out on all of the probes configured, some probes can optionally remain inactive in a particular system configuration. If all of the probes in a given system are no longer being evaluated a count of zero will be recorded 634, indicating there may be a problem with the probes. As long as one probe remains operational and is returning readings, the tool can remain in use until a convenient service window opens, at which time the failing probes can be replaced.

More complex algorithms can be applied. For example, gamma sensors can be disqualified if one drifts apart from the other, or as well is they become too noisy and return values that are within bounds but erratic. All of the thresholds and disqualification parameters are configurable. In another embodiment, the multiple gamma controller assembly can be configured to exclude measurements or disqualify measurements based on the conditions at the time. For example, if a high shock (triboluminescence) event occurs, the assembly could suspend measurement or disqualify measurements for a given time period during or near the shock event. Other events may also suspend measurement, another example might be when other operations are being performed by the measurement while drilling tool or other downhole tools that could potentially give off electrical noise, the multiple gamma controller assembly can be notified before such an event occurs or be programmed with algorithms to detect such an event through sensor measurement or other methods. High temperature events can also receive similar treatment. The conditions which trigger these events are programmable and can vary based on the probes being used and their particular sensitivities.

To assist with failure analysis when the tool is being serviced, the multiple gamma controller assembly can log several relevant parameters of the gamma controller assembly or of other components of the tool as it is operating. There are at least two classifications of events that can be logged: time-based logs and event-based logs. Time-based logs can include parameters that are logged periodically regardless of what is happening with the tool. Examples of this include temperature, battery voltages, motor bus voltage, axial vibration, lateral vibration, moving average of the counts from each gamma probe, etc. Event-based logs can include specific events that may occur, including axial or lateral shock events, as monitored by the accelerometers or other similar sensors, changes in the state of the flow signal, changes in the state of the pulse line, the duration of a pulse event, etc.

In an embodiment, the multiple gamma controller can be configured with "high-g" and "low-g" accelerometers to measure shock and vibration measurements. Generally, shock is considered events above 25G, and can be recorded along with other information, such as time, date, and other sensor values. Recording the number of shock events provides a good predictor of a particular type of drilling environment and allows the prediction of the remaining lifetime of the multiple gamma assembly for a certain number of gamma probes in that type of environment or at that particular wellsite. If a shock is recorded above a very high threshold, immediate replacement of the crystal and photomultiplier assembly can be considered as they may be very close to failure if not already malfunctioning. Messages can be sent by the microcontroller through the measurement while drilling tool interface or separately to the surface to alert operations personnel. The same considerations can be applied to vibration measurement by the "low-g" accelerometers. The multiple gamma assembly can be configured such that down-hole vibration levels can be continuously calculated and logged to memory. Additionally the multiple gamma assembly can also be configured with on-board temperature sensors and the complete temperature profile history may be tracked since high temperatures also place very high stress on the board. Thresholds may be set for temperature events and similarly to gamma failure, shock, or vibration events, messages can be sent to the surface through the measurement while drilling tool interface or through a separate interface to the surface.

In another embodiment, event "odometers" can be setup to tack the various tool health indicators, such as the various sensor values, as previously mentioned. The odometers may accumulate value as separate, shock, vibration, and temperature odometers, and provide an idea to the tool operators of the general abuse a particular tool has taken. This may be useful to determine and improve upon common modes of failure for a particular tool design. For example, it may be found that tools with a certain level on their vibration odometers are likely fail within a calculated timeframe based on tool data compiled over time. Vibration odometers can be configured to represent total time spent at vibration levels corresponding to bin divisions. Temperature odometers can be configured to represent total time spent at temperature levels corresponding to bin divisions. Odometers can optionally be reset when the multiple gamma controller assembly is paired with different gamma probes or when the multiple gamma controller circuit board is replaced.

In an embodiment, the multiple gamma controller assembly can be configured to apply individual calibrations for each gamma probe, optionally applying the calibrations before averaging or determination operations are performed. The averaged or calculated values can be transmitted to the measurement while drilling tool as synthesized voltage pulses as well as through the generic variable communication mean available, such as by a serial port communication to the measurement while drilling tool. The measurement while drilling tool is programmed with a calibration of 1.0 (multiplier) so as not to skew the data calculated by the multiple gamma controller assembly, for a given embodiment.

These logs allow the failures of the gamma probes to be analyzed and improve future operational guidelines to help prevent future failures of gamma probes downhole. Additionally, these logs allow predictive maintenance to be performed by preemptively replacing gamma probes that are likely to fail soon, before a downhole failure occurs. Gamma probes are generally constructed by pairing NaI(TI) (Sodium Iodide/Thalium) crystals with photomultiplier tubes. The probes also often have high voltage supply circuitry and a discriminator circuit integrated as well. Each component and the paired assembly have inherent structural weaknesses and can malfunction when exposed by the harsh conditions of a drilling environment. The gamma probe components are very temperature, vibration and shock sensitive, and often break irreparably in the drilling environment. In addition, the photomultiplier has glass components, which are particularly sensitive to vibration and shock.

A gamma probe is configured to produce a pulse when a gamma wave/particle emitted from a geological formation comes into contact with the NaI(TI) crystal of the gamma probe. When collision occurs, a photon is produced. A hermetically sealed enclosure of the crystal is internally reflective, and will guide the photon out of one open end of the crystal, which is configured with a clear glass lens. The photon will travel out of the crystal, through the optical lens, and into a photomultiplier tube of the gamma probe. When the photon strikes a particular surface of the photomultiplier tube, an electrical current pulse is generated. The photomultiplier tube's purpose is to convert the photon into electrical energy so that it can be sent to and interpreted/read by the microcontroller circuitry of the multiple gamma controller assembly. A high voltage power supply is required to operate the photomultiplier tube. For example, photomultiplier tubes often require voltages around 1500V DC.

Although the concepts disclosed herein have been described in connection with the preferred form of practicing them and modifications thereto, those of ordinary skill in the art will understand that many other modifications can be made thereto. Accordingly, it is not intended that the scope of these concepts in any way be limited by the above description.

The invention claimed is:

1. A downhole measurement assembly to facilitate the reliable downhole measurement of radiation given off by geological formations adjacent a wellbore, the downhole measurement assembly comprising:
a plurality of gamma probes configured within a single well zone to sense radiation given off by downhole formations and to provide output pulses representative of the radiation,
one or more microcontrollers, at least one of which is configured to receive the output pulses from the plurality of gamma probes, at least one microcontroller configured to detect when one of the plurality of gamma probes is providing output pulses that may indicate one or more probes has malfunctioned, and
one or more memory elements to store gamma controller assembly executable code and gamma probe data.

2. The downhole measurement assembly of claim 1, further comprising:
one or more power supplies to provide power to the one or more microcontrollers, the plurality of gamma probes, and the one or more memory elements.

3. The downhole measurement assembly of claim 1, further comprising:
a communication pathway between each of the plurality of gamma probes and at least one of the one or more microcontrollers wherein the output pulses of each of the plurality of gamma probes are configured to communicate on the communication pathway to the at least one of the one or more microcontrollers for interpretation and logging to memory.

4. The downhole measurement assembly of claim 3, wherein the one or more microcontrollers are configured to analyze the output pulses of each of the plurality of gamma probes and determine if one or more probes is malfunctioning.

5. The downhole measurement assembly of claim 4, wherein the one or more microcontrollers are configured to disqualify or disregard the output pulses from each of the plurality of gamma probes determined to be malfunctioning.

6. The downhole measurement assembly of claim 5, wherein the one or more microcontrollers are configured to continue analyzing the output pulses from each of the plurality of gamma probes determined to be malfunctioning and re-qualify a gamma probe that is determined to have returned to acceptable operating parameters.

7. The downhole measurement assembly of claim 1, further comprising:
one or more communication pathways to convey gamma probe data between the downhole measurement assembly and a remote computer.

8. The downhole measurement assembly of claim 1, wherein the at least one microcontroller configured to detect when one of the plurality of gamma probes has malfunctioned uses pre-determined pulse count potential failure values to determine when the one of the plurality of gamma probes has malfunctioned.

9. The downhole measurement assembly of claim 1, wherein the at least one microcontroller is configured to filter the output pulses of each of the functioning plurality of gamma probes and provide one output pulse representing the multiple output pulse values to a measurement while drilling apparatus.

10. The downhole measurement assembly of claim 1, wherein the at least one microcontroller is configured to combine the output pulses of each of the functioning plurality of gamma probes and provide one output pulse representing the multiple output pulse values to a measurement while drilling apparatus.

11. The downhole measurement assembly of claim 1, wherein the at least one microcontroller is configured to average the output pulses of each of the functioning plurality of gamma probes and provide one output pulse representing the multiple output pulse values to a measurement while drilling apparatus.

12. A method of measuring radiation given off by geological formations downhole, the method including the following steps:
deploying a radiation measurement assembly downhole, the radiation measurement assembly comprising:
a plurality of gamma probes configured within a single well zone to sense radiation given off by downhole formations and provide output pulses representative of the radiation, one or more microcontrollers, at least one of which is configured to detect when one of the plurality of gamma probes is providing output pulses that may indicate that one or more probes has malfunctioned, and one or more memory elements for storing the gamma controller assembly executable program and for logging gamma probe data;

sensing radiation given off downhole from formations by the plurality of gamma probes, the plurality of gamma probes each generating pulses that are communicated to at least one of the one or more microcontrollers;

interpreting the pulses given off by each of the plurality of gamma probes by at least one of the one or more microcontrollers such that the pulses are each assigned representative data;

determining if one or more of the representative data interpreted from each one of the plurality of gamma probes may indicate that a particular one of the gamma probes has malfunctioned; and disqualifying one of the plurality of gamma probes, responsive to the determining step, such that the pulses output by the disqualified gamma probe are no longer considered valid.

13. A downhole measurement assembly to facilitate the reliable downhole measurement of radiation given off by geological formations adjacent a wellbore, the downhole measurement assembly comprising:

a plurality of gamma probes configured within a single well zone to sense radiation given off by downhole formations and provide output pulses representative of the radiation, one or more microcontrollers, at least one of which is configured to detect when one of the plurality of gamma probes is providing output pulses that may indicate the probe has malfunctioned, a communication pathway between each of the plurality of gamma probes and at least one of the one or more microcontrollers wherein the output pulses of each of the plurality of gamma probes are communicated on the communication pathway to at least one of the one or more microcontrollers for interpretation and logging, one or more communication pathways to convey gamma probe data between the downhole measurement assembly and a remote computer, and non-transitory computer-readable storage medium in communication with the one or more microcontrollers with an executable program stored thereon, the executable program comprising a set of instructions that, when executed by the one or more microcontrollers, causes the one or more microcontrollers to perform the operations of:

sensing radiation given off downhole from formations by the plurality of gamma probes, the plurality of gamma probes each generating pulses that are communicated to at least one of the one or more microcontrollers;

interpreting the pulses given off by each of the plurality of gamma probes by at least one of the one or more microcontrollers such that the pulses are each assigned representative data;

determining if one or more of the representative data interpreted from each one of the plurality of gamma probes may indicate that a particular one of the gamma probes has malfunctioned; and disqualifying one of the plurality of gamma probes, responsive to the determining step, such that the pulses output by the disqualified gamma probe are no longer considered valid.

14. A downhole measurement assembly as defined in claim 13, wherein the non-transitory computer-readable storage medium further comprises a set of instructions that when executed by the one or more microcontrollers, causes the one or more microcontrollers to perform the operations of:

interpreting the pulses given off by each of the disqualified gamma probes by at least one of the one or more microcontrollers such that the pulses are each assigned representative data;

determining if one or more of the representative data interpreted from each one of the disqualified gamma probes may indicate that a particular one of the disqualified gamma probes has resumed to function within predetermined bounds; and re-qualifying one of the disqualified gamma probes, responsive to the determining step, such that the pulses output by the re-qualified gamma probe are considered valid.

15. A downhole measurement assembly as defined in claim 13, wherein the non-transitory computer-readable storage medium further comprises a set of instructions that when executed by the one or more microcontrollers, causes the one or more microcontrollers to perform the operations of:

logging representative data to memory by at least one of the one or more microcontrollers.

16. A computer-implemented method to facilitate the reliable downhole measurement of radiation given off by geological formations adjacent a wellbore, the computer-implemented method comprising the following steps:

sensing radiation given off downhole from formations by a plurality of gamma probes configured within a single well zone, the plurality of gamma probes each generating pulses that are communicated to at least one of one or more microcontrollers;

interpreting the pulses given off by each of the plurality of gamma probes by at least one of the one or more microcontrollers such that the pulses are each assigned representative data;

determining if one or more of the representative data interpreted from each one of the plurality of gamma probes may indicate that a particular one of the gamma probes has malfunctioned; and disqualifying one of the plurality of gamma probes, responsive to the determining step, such that the pulses output by the disqualified gamma probe are no longer considered valid.

17. The computer-implemented method of claim 16, wherein the computer-implemented method further comprises the following steps:

interpreting the pulses given off by each of the disqualified gamma probes by at least one of the one or more microcontrollers such that the pulses are each assigned representative data;

determining if one or more of the representative data interpreted from each one of the disqualified gamma probes may indicate that a particular one of the disqualified gamma probes has resumed to function within predetermined bounds; and re-qualifying one of the disqualified gamma probes, responsive to the determining step, such that the pulses output by the re-qualified gamma probe are considered valid.

18. The computer-implemented method of claim 16, wherein the computer-implemented method further comprises the following steps:
  logging representative data to memory by at least one of the one or more microcontrollers.

19. The computer-implemented method of claim 16, wherein the computer-implemented method further comprises the following steps:
  indicating to a remote computer at the surface when one or more of the gamma probes has been disqualified.

20. The computer-implemented method of claim 16, wherein the computer-implemented method further comprises the following steps:
  indicating to a remote computer at the surface when one or more of the gamma probes has been re-qualified.

21. The computer-implemented method of claim 16, wherein the computer-implemented method further comprises the following steps:
  communicating to a measurement while drilling tool, by the one or more microcontrollers, a single filtered pulse train representing the output of the one or more gamma probes.

22. The computer-implemented method of claim 16, wherein the computer-implemented method further comprises the following steps:
  communicating to a measurement while drilling tool, by the one or more microcontrollers, a single filtered pulse train that is generated by averaging the outputs of the non-disqualified one or more gamma probes in communication with the one or more microcontrollers.

* * * * *